United States Patent
Tufano et al.

(10) Patent No.: US 7,476,325 B2
(45) Date of Patent: Jan. 13, 2009

(54) TREATMENT OF RECREATIONAL WATER

(75) Inventors: Thomas Peter Tufano, Wilmington, DE (US); Peter Arnold Morken, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 375 days.

(21) Appl. No.: 11/200,422

(22) Filed: Aug. 9, 2005

(65) Prior Publication Data

US 2007/0034575 A1    Feb. 15, 2007

(51) Int. Cl.
    *C02F 1/72*    (2006.01)
(52) U.S. Cl. .................. 210/759; 424/408; 252/176
(58) Field of Classification Search .......... 424/408; 252/176; 210/759
    See application file for complete search history.

(56) References Cited

U.S. PATENT DOCUMENTS

| | | | |
|---|---|---|---|
| 4,692,494 A | 9/1987 | Sonenstein | |
| 4,747,976 A | 5/1988 | Yang et al. | |
| 5,055,183 A | 10/1991 | Buchan | |
| 5,394,990 A | 3/1995 | Edwards et al. | |
| 5,658,977 A | 8/1997 | Yang et al. | |
| 6,727,219 B2 * | 4/2004 | Buckland et al. ........... 510/439 |
| 6,787,512 B1 * | 9/2004 | Verrall et al. ............ 510/293 |
| 6,821,590 B2 | 11/2004 | Verrall et al. | |
| 2002/0030470 A1 | 3/2002 | Takahashi et al. | |
| 2002/0161088 A1 | 10/2002 | Kochvar et al. | |
| 2003/0077005 A1 | 4/2003 | Fisher et al. | |
| 2004/0161557 A1 | 8/2004 | Verrall et al. | |
| 2004/0161559 A1 | 8/2004 | Verrall et al. | |
| 2004/0186034 A1 | 9/2004 | Verrall et al. | |
| 2004/0186035 A1 | 9/2004 | Johnston et al. | |

FOREIGN PATENT DOCUMENTS

| | | |
|---|---|---|
| BR | 6902229 | 1/1990 |
| DE | 10237197 | 2/2004 |
| DE | 10244802 | 4/2004 |
| DE | 10305799 | 9/2004 |
| EP | 544602 | 6/1993 |
| FR | 2724388 | 3/1996 |
| GB | 1129230 | 10/1968 |
| JP | 1996131049 | 5/1996 |
| JP | 2005054018 | 3/2005 |
| RO | 116905 | 7/2001 |

OTHER PUBLICATIONS

Katayama, Tetsuya; New water-soluble polymers for improving new high performance paper; Kami Parupu Gijutsu Taimusu (1996), 39(7), 10-15; Poval Sales Section, Kuraray Co., Ltd., Japan, Abstract.

* cited by examiner

*Primary Examiner*—Walter D Griffin
*Assistant Examiner*—Cameron J Allen
(74) *Attorney, Agent, or Firm*—Nancy S. Mayer

(57) ABSTRACT

An oxidizing agent comprising a pre-measured amount of stabilized potassium hydrogen peroxymonosulfate and a buffer in a sealed water-soluble pouch, said pouch comprising a hydrolyzed copolymer of vinyl acetate and at least one of acrylic acid, methacrylic acid, maleic acid, itaconic acid, and esters thereof is disclosed.

24 Claims, No Drawings

TREATMENT OF RECREATIONAL WATER

BACKGROUND OF THE INVENTION

Water-soluble packaging material commonly comprises polyvinyl alcohol films. Polyvinyl alcohol is manufactured commercially by polymerization of vinyl acetate monomer to yield polyvinyl acetate. The polyvinyl acetate is then transesterified, typically using methanol, to yield polyvinyl alcohol and methyl acetate. Polyvinyl alcohol that is greater than 98% hydrolyzed (that is, less than 2% residual vinyl acetate) is unacceptable for water treatment applications because it does not dissolve at practical temperatures, usually requiring temperatures in excess of 50° C. to dissolve. Of greater utility are packaging materials that dissolve in cold water, that is, water at a temperature of from 10-25° C. This can be accomplished by modifying polyvinyl alcohol to reduce crystallinity and/or increase hydrophilicity of the polymer. The crystallinity of the polymer is conveniently and conventionally reduced by carrying out the transesterification of polyvinyl acetate in such a manner as to not complete the conversion to polyvinyl alcohol and obtain a product that is conventionally known as partially hydrolyzed polyvinyl alcohol.

In order to be practical and useful, the films should be compatible with the chemicals they contain. For example, a film made from partially hydrolyzed polyvinyl alcohol is sensitive to high or low pH chemicals, as they cause hydrolysis of the residual vinyl acetate, causing the film composition to change towards the cold-water insoluble and fully hydrolyzed polyvinyl alcohol. Acidic pool chemicals such as potassium hydrogen peroxymonosulfate or caustic pool chemicals, if packaged in a film comprising partially hydrolyzed polyvinyl alcohol, cause the hydrolysis reaction which results in a deterioration of the film solubility. Additionally the packages can exhibit an odor of acetic acid, which is unpleasant to consumers.

Buckland et al., in U.S. Pat. No. 6,727,219, disclose stabilized potassium hydrogen peroxymonosulfate packaged in a sealed water-soluble pouch, optionally including various additives, including pH buffers, such as anhydrous sodium carbonate and bicarbonate; active halogen agents such as halogenated hydantoins; and halogen stabilizers such as cyanuric acid. The water-soluble pouch compositions included partially hydrolyzed polyvinyl alcohol. Buckland et al. do not provide information on the stability of partially hydrolyzed polyvinyl alcohol films to long-term storage in contact with stabilized potassium hydrogen peroxymonosulfate compositions. Such storage causes reduced film solubility and formation of acetic acid.

In U.S. Pat. No. 6,821,590, Verrall et al. describe starch-loaded polyvinyl alcohol copolymer films for packaging non-liquid products. Starch loadings were from about 4 to about 30% by weight. This patent does not teach how to package low pH solids.

It is desirable to have a storage stable single dosage oxidizing agent for treatment of recreational waters. Such an agent requires that a stable pouch material be used to package such moisture-sensitive acidic materials to avoid loss of cold-water solubility, acetic acid formation, and other indicators of deterioration on prolonged storage. The present invention provides such a product.

SUMMARY OF THE INVENTION

The present invention comprises an oxidizing agent comprising a pre-measured amount of stabilized potassium hydrogen peroxymonosulfate and a buffer in a sealed water-soluble pouch, said pouch comprising a hydrolyzed copolymer of vinyl acetate and at least one of acrylic acid, methacrylic acid, maleic acid, itaconic acid, and esters thereof.

The present invention further comprises a method of treating water comprising adding to the water a sealed water-soluble pouch containing a pre-measured amount of an oxidizing agent comprising stabilized potassium hydrogen peroxymonosulfate and a buffer, said pouch comprising a hydrolyzed copolymer of vinyl acetate and at least one of acrylic acid, methacrylic acid, maleic acid, itaconic acid, and esters thereof.

DETAILED DESCRIPTION

Herein trademarks are shown in upper case.

As used herein, the term "(meth)acrylic" indicates acrylic or methacrylic, and the term "(meth)acrylate" indicates acrylate or methacrylate. By the term "copolymer" is meant that at least two distinct monomers are present in the copolymer composition. The term "PVOH" is used herein to mean polyvinyl alcohol. The term "PVAc" is used herein to mean polyvinyl acetate. The term "phPVOH" is used herein to mean partially hydrolyzed polyvinyl alcohol.

Potassium hydrogen peroxymonosulfate ($KHSO_5$) is known to be moisture sensitive and chemically unstable in that the peroxygen will readily react. It is therefore typically used in the form of a salt that is more stable. The term "stabilized potassium hydrogen peroxymonosulfate" is used herein to denote potassium hydrogen peroxymonosulfate and stabilized compositions thereof. This includes salts of potassium hydrogen peroxymonosulfate. In particular it includes the mixed triple salt $2KHSO_5 \cdot KHSO_4 \cdot K_2SO_4$, a crystalline salt of enhanced stability having a theoretical active oxygen content of 5.2%, and commercial versions thereof typically having an active oxygen content of about 4.7%.

Stabilized potassium hydrogen peroxymonosulfate is used as an auxiliary oxidant or water shock treatment for pools, spas, and other recreational and ornamental waters, including for example fountains, reflecting pools, ornamental ponds, and the like. It is used to reduce the non-microbial waste content and restore the sparkle and clarity of such bodies of water and to do so without forming the irritating and malodorous chloramines associated with chlorinating products such as calcium hypochlorite. Stabilized potassium hydrogen peroxymonosulfate, in contrast to chlorine bleaches such as calcium hypochlorite, provides oxidation without undesirable side effects such as bleaching or fading of vinyl liners, painted surfaces, or swimsuit fabrics.

Attempts were made to overcome the deterioration of phPVOH when used to package dry, acidic chemicals by making blends with dry, basic chemicals in a ratio such that, after dissolution in water, the aqueous pH of the solution was about 7. However, exposure of phPVOH film to such a dry blend of acidic and basic chemicals still led to a deterioration of the film solubility, resulting in an increase in the time to dissolve. Unexpectedly, however, exposure of PVOH copolymers used in the present invention containing carboxylate groups as salts to such a blend of acidic and basic chemicals resulted in neither a problematic loss of solubility nor an unpleasant acetic acid odor.

The present invention provides storage-stable prepackaged blends of an oxidizing agent comprising stabilized potassium hydrogen peroxymonosulfate packaged in a water-soluble pouch, for use in treating re-circulating water (especially swimming pools and spas). Preferably, the prepackaged blends are single dosage units. Specifically, the cold-water-soluble film employed for the pouch is made from a resin comprising a hydrolyzed copolymer of vinyl acetate and a second anionic monomer. The degree of hydrolysis of the poly(vinyl acetate) in such copolymer films is high, e.g., >98%. Thus, little residual vinyl acetate remains in the pouch film composition that can act as an acetic acid source or be hydrolyzed by acidic or caustic chemicals.

The composition of the copolymer films used in the present invention comprises hydrolyzed copolymers of vinyl acetate with at least one of acrylic acid, acrylate ester, methacrylic acid, methacrylate ester, maleic acid, maleic ester, itaconic acid, and itaconic acid ester. Esters of acrylic acid are preferred; methyl acrylate is more preferred. The copolymers can also further comprise vinyl caprolactam and low levels of other monomers such as ethylene, propylene, and the like. Copolymers of vinyl acetate and methyl (meth)acrylate can be prepared, for example, in methanol, which acts as both a chain transfer agent and a solvent, and in the presence of a free radical initiator to form the copolymer. The amount of the acrylic comonomer is about 1 to about 12 mol %, preferably about 2 to about 8 mol %, and more preferably about 4 to about 6 mol %. When the copolymer is transesterified in methanol, carboxyl groups react with adjacent alcohol groups to form a lactone structure along the polymer chain that is readily detected by infrared analysis at about 1740 cm$^{-1}$. The copolymer in lactone form is soluble in hot but not cold water. Subsequent reaction with a basic substance in the presence of water causes hydrolysis of the lactone to the carboxylate salt form, which is cold-water soluble in the film form. Amines and alkali metal (Group I of periodic table) hydroxides are convenient hydrolysis agents, and sodium hydroxide is preferred.

The reactions for making the preferred films are shown below in Reaction Sequence 1.

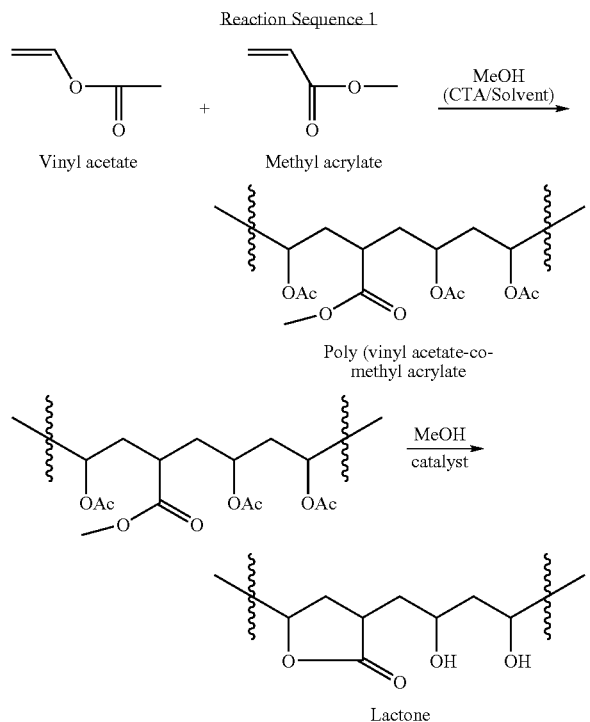

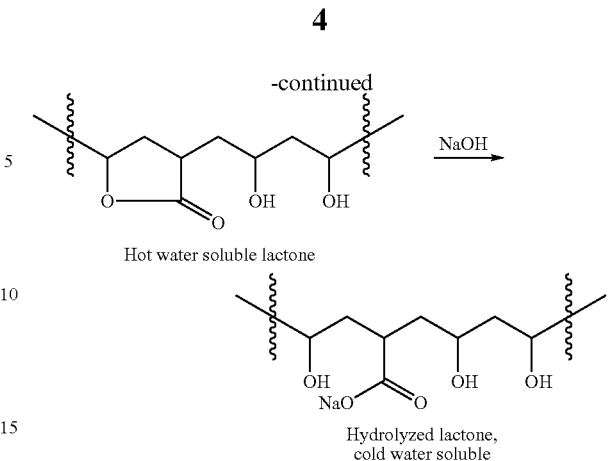

The vinyl alcohol-gamma lactone copolymer (denoted "Hot-water soluble lactone" in Reaction Sequence 1) preferably has a 4% solution viscosity in the range of from about 5 to about 50 cPs (0.005 to 0.050 Pa·s) at 20° C. (68° F.) More preferably the vinyl alcohol-gamma lactone copolymer has a 4% solution viscosity in the range of from about 8 to about 35 cPs (0.008 to 0.035 Pa·s) and, most preferably, the vinyl alcohol-gamma lactone copolymer has a 4% solution viscosity in the range of from about 15 to about 25 cPs (0.015 to 0.025 Pa·s).

The composition of the film also preferably comprises at least one plasticizer, such as in the range of from about 5 to about 30 percent by weight, preferably about 10 to about 20 percent by weight, or preferably in the range of from about 20 to about 30 percent by weight when sorbitol is present as a plasticizer.

The composition of the film also optionally comprises at least one lubricant/release agent in the range of from about 0.0% to about 1.5% by weight, and at least one surfactant in the range of from about 0.01% to about 1.5% by weight. Other suitable optional components, such as additional plasticizers, lubricants, and release agents, fillers, extenders, antiblocking agents, detackifying agents, antifoams and other functional ingredients, are added in proper amounts to achieve a desired effect to the extent such components do not inhibit other desired characteristics of the copolymer film. Reducing agents such as sodium metabisulfite can optionally be added to reduce the yellow color of film articles.

The copolymer and any additives as described above are slurried in water with about 30 to about 100%, preferably about 60 to about 80%, of the stoichiometric amount of a base, such as an amine or alkali metal hydroxide and preferably sodium hydroxide, to hydrolyze the lactone, as shown in Reaction Sequence 1. The slurry is heated to 70-100° C. to dissolve the polymer and cause hydrolysis of lactones. The solution containing the cold-water soluble and hydrolyzed form of the copolymer is solution-cast into films using any conventional method. For example such film casting methods are described in US Patent Application 2004/0161559 and U.S. Pat. No. 6,821,590, using an apparatus such as described in WO 2004/089593. The solution-casting procedure creates a film having a thickness in the range of from about 0.0005 to about 0.007 inches (about 0.013 to about 0.18 mm), preferably about 0.001 to about 0.005 inches (about 0.025 to about 0.13 mm), and more preferably from about 0.001 to about 0.003 inches (about 0.025 to about 0.076 mm). The film thickness can have a direct effect on the speed at which the pouch will dissolve in water, with thin films (e.g., less than 0.003 inches or 0.076 mm) completely dissolving in less time.

Conversely, thinner films typically provide less structural protection than their thicker film counterparts.

A preferred requirement of the film, and therefore the formed package, is that it be capable of complete dissolution in water in a relatively short period of time. A preferred film of the present invention has a thickness of about 1.5 mil (about 0.038 mm). Films useful in the present invention have a dissolution time in water at about 10° C. of less than 150 seconds, preferably less than 60 seconds.

Suitable plasticizers include, but are not limited to, glycerin, diglycerin, sorbitol, ethylene glycol, diethylene glycol, triethylene glycol, tetraethylene glycol, propylene glycol, polyethylene glycols up to 400 MW, neopentyl glycol, trimethylolpropane, polyether polyols and ethanolamines. Preferred plasticizers are glycerin, triethyleneglycol, propylene glycol and trimethylolpropane.

Suitable surfactants include the nonionic, cationic, anionic and zwitterionic classes. Preferably, the surfactants will be of the nonionic, cationic or zwitterionic classes or combinations of these. Examples of suitable surfactants include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkylbetaines and sulfobetaines (zwitterionics). Preferred surfactants are alcohol ethoxylates, quaternary ammonium salts and amine oxides.

Examples of suitable lubricants/release agents include, but are not limited to, fatty acids and their salts, fatty alcohols, fatty esters, fatty amines, fatty amine acetates and fatty amides. Preferred lubricants/release agents are fatty acids, fatty acid salts, and fatty amine acetates.

Examples of suitable fillers, extenders, antiblocking agents, and detackifying agents include, but are not limited to, starches, modified starches, crosslinked polyvinylpyrrolidone, crosslinked cellulose, microcrystalline cellulose, silica, metallic oxides, calcium carbonate, talc and mica. Preferred materials are starches, modified starches and silica. If used, the preferred amount of such filler, extender, antiblocking agent, or detackifying agent in the water-soluble film used in the present invention is between about 0.1% and about 25% by weight, more preferably between about 1% and about 15% by weight, and preferably between about 1% and about 5% by weight if starch is absent.

Examples of suitable antifoams include, but are not limited to, those based on polydimethylsiloxanes and hydrocarbon blends. If used, the preferred amount of antifoam in the water-soluble film used in the present invention is between about 0.001% and about 0.5%, more preferably between about 0.01% and about 0.1% by weight.

The resulting film can then be formed into a package for containing the stabilized potassium hydrogen peroxymonosulfate, buffer, and other optional water treatment chemicals as described below. Formation of such a suitable package is known by those skilled in the art. Any convenient method for charging the stabilized potassium hydrogen peroxymonosulfate into the pouch, compressing the pouch to expel air, and sealing the pouch is suitable for use in the present invention. Sealing is typically accomplished by heat, using the film manufacturer's recommendations. Typically a pressure of from about 6 to about 7 bar (600 to 700 kPa), at a temperature of from about 160 to about 180° C., and a dwell time of about 0.3 to about 0.5 seconds is used. Sealing is also accomplished by use of a solvent or water.

For higher volume commercial production, any suitable commercial packing equipment having the ability to compress the pouch prior to sealing (to remove sufficient air) is used. An example of a typical commercial volume filling line employs an Elpack Corporation GR-10M unit dosing mechanism (Even-Yehuda, Tel Aviv, Israel) used in combination with a Hayssen Ultima 12-16 film package forming mechanism (Duncan, S.C.). The stabilized potassium hydrogen peroxymonosulfate is introduced to the unit dosing mechanism from a flexible bulk intermediate container via a feed hopper. The unit dosing mechanism delivers a pre-measured dose to the forming collar of the form-fill-seal machine in response to a signal sent from the form-fill-seal machine control logic. The dose is sealed into a pouch of film according to normal machine operation, and is delivered to a packaging table or container via an inclined conveyor. Packaged doses are placed in suitable containers for shipment. The manufacturers' recommendations for operating this equipment are followed.

Other suitable alternative equipment for these production steps can be employed. For instance, alternative weighers are combination weighers as manufactured by Ishida Scales Mfg. Co., Ltd. (Kyoto, Japan) and linear net weighers as are manufactured by Optima Machinery Corp. (Schwabisch Hall, Germany), Parsons Scales, LLC (De Pere Wis.), and Mettler (Toledo Ohio). Other examples of form, fill, and seal machines are produced by Robert Bosch Corp., Packaging Machine Division (South Plainfield N.J.), Rovema Packaging Machines L.P. (Lawrenceville Ga.). Multi-lane form, fill, and seal machines are produced by Fres-co Systems USA, Inc. (Telford Pa.) and Circle Packaging Machinery Co. (Green Bay Wis.).

Pouches are typically filled vertically and sealed with the optional application of vacuum to achieve the desired package specific gravity of greater than 1.0. Alternatively and preferably, the solid potassium hydrogen peroxymonosulfate is tightly wrapped by the water-soluble film by stretching the film around the solid composition so as to make a suitably densely packed pouch. Optionally, heat shrink-wrap and vacuum techniques can also be utilized. The preferred stretch-wrapped 30-gram pouch design dissolves completely in less than 1 minute in a 300 US gallon (1136 L) spa maintained at 99 to 100° F. (37° to 38° C.), while a 30-gram pouch prepared on a traditional vertical-fill machine where the contents are more loosely packed) dissolves in approximately 2 minutes.

The package or pouch contents of the present invention are all dry free-flowing granular, solid materials and anhydrous salts, and comprise stabilized potassium hydrogen peroxymonosulfate with a buffer. The particle size is typically from about 45 to about 1200 micrometers. Suitable pH buffers maintain correct pH and alkalinity, and include, but are not limited to, anhydrous alkali metal carbonates such as sodium carbonate, sodium sesquicarbonate, and sodium bicarbonate; alkali metal silicates, alkali metal phosphates such as dipotassium phosphate and tripotassium phosphate). The oxidizing composition is sufficiently buffered so that the pH of a 1% aqueous solution of the pouch contents is greater than about 6 and preferably greater than about 7.

The pouch contents may optionally be blended with other water treatment chemicals. The types of optional additives are not intended to be all-inclusive. The optional additives include diluents, (e.g., sodium sulfate); clarifiers (e.g., anionic, nonionic, and cationic polymers, such as ZETAG 7568 available from Ciba Specialties of Suffolk, Va.) chitin, and chitosan; algae control agents (e.g., copper salts such as sulfate, metal ions such as silver and zinc, quaternary ammonium chloride products such as alkyl dimethyl benzyl ammonium chloride formulations, and polymeric quaternary ammonium chloride products); sodium chloride; sodium bromide; other oxidizers (e.g., persulfates such as sodium peroxydisulfate, percarbonates); stabilized active halogen agents (e.g. sodium dichlor-s-triazinetrione, halogenated hydantoins); halogen stabilizers (e.g., cyanuric acid, sulfamic acid, and dimethylhydantoin); biocidal polymers such as poly(hexamethylenebiguanide); miscellaneous water modifiers (e.g., calcium chloride, chelating agents such as ethylenediamine tetraacetic acid, diethylenetriamine pentaacetic acid, and citric acid); corrosion inhibitors; fluorosurfactants; enzymes; lanthanum salts such as the carbonate and chloride; activators such as tetraacetylethylenediamine and ketones; surfactants; fragrances; and dyes and colorants.

The present invention further comprises a method of treating water comprising adding to the water a sealed water-soluble pouch containing a pre-measured amount of an oxidizing agent comprising stabilized potassium hydrogen peroxymonosulfate and a buffer, said pouch comprising a hydrolyzed copolymer of vinyl acetate and at least one of acrylic acid, acrylate ester, methacrylic acid, methacrylate ester, maleic acid, maleic ester, itaconic acid, and itaconic acid ester.

The hydrolyzed copolymer film used for the pouch in the present invention is as described above. Preferably, it is a water-soluble copolymer of hydrolyzed vinyl acetate and methyl acrylate, prepared and solution-cast as described above. The monomer proportions are about 90 to about 98 mole % vinyl acetate/alcohol and about 2 to about 10 mole % methyl acrylate. The level of hydrolysis is greater than 98%.

The occurrence of an acetic acid odor with prior art phPVOH films upon storage parallels the deterioration of the cold water solubility. Without wishing to be bound by theory, the explanation may be that, as acetic acid is liberated from the film, the effective degree of hydrolysis of the film increases, leading to progressively increasing crystallinity of the poly(vinyl alcohol) film. For prior art poly(vinyl acetate) films having hydrolysis levels of about 85-90 mole %, there is an increased potential to form acetic acid due to hydrolysis and lose cold water solubility. The hydrolyzed copolymer films of greater than 98% hydrolysis used in the present invention, however, do not rely upon vinyl acetate groups for cold water solubility, so do not fail by increasing hydrolysis.

On the other hand, while the hydrolyzed copolymer films used in the present invention in a low pH environment can lose cold-water solubility due to protonation of the acrylate salt and lactone reformation, unexpectedly this does not occur when a buffer, such as sodium carbonate, is mixed with the dry stabilized potassium hydrogen peroxymonosulfate. The oxidizing agent used in the method of the present invention is stabilized potassium hydrogen peroxymonosulfate in the form of the triple salt, available commercially as the active ingredient in OXONE monopersulfate compound available from E.I. du Pont de Nemours and Company, Wilmington Del., in combination with a suitable buffer as described above.

The pre-packaged oxidizing agent of the present invention has several advantages. The copolymer film used in the present invention provides excellent cold-water solubility. In combination with compositions containing buffered stabilized potassium hydrogen peroxymonosulfate, the copolymer does not result in an objectionable acetic acid odor upon storage in a secondary container, nor does the cold-water solubility of the film decrease with storage time. The pH neutral oxidizing compositions preserve rapid solubility of the carboxylate-containing resin/film. The preferred tightly wrapped pouch provides a more densely packed solid composition versus traditional vertical-fill pouches. The additional compaction provides for faster and more vigorous dissolution of the solid oxidizing composition due to closer proximity of the effervescing components of the composition. The storage stability and faster dissolution provide more convenience and effectiveness in use to treat recreational water.

Materials and Test Methods

The following materials were used in the Examples herein.

Film 1 is a water-soluble copolymer film of hydrolyzed vinyl acetate and methyl acrylate, containing about 95 mole % vinyl acetate/vinyl alcohol and about 5 mole % methyl acrylate, and a hydrolysis level of greater than 98%, available from MonoSol LLC in Portage Ind.

Film 2 is a partially hydrolyzed polyvinyl alcohol film (phPVOH) available from MonoSol LLC in Portage Ind.

OXONE monopersulfate compound (or potassium hydrogen peroxymonosulfate) is the mixed triple salt $2KHSO_5.KHSO_4.K_2SO_4$, a crystalline salt of enhanced solid-state stability, and is available from E.I. du Pont de Nemours and Company, Wilmington Del.

ZETAG 7568 is polymer, propenaminium, dimethyl propenyl, chloride, a cationic clarifier available from Ciba Specialties, Suffolk Va.

Test Method 1—Film Solubility Test.

Detailed test methods for determining the compatibility of packaged chemicals with PVOH and the solubility of PVOH are available from MonoSol, LLC (Portage Ind.).

MonoSol Method MSTM 177, "Standard Test Method for Determination of Product Compatibility with MONOSOL Water Soluble Film" includes a description of storage conditions for accelerated stability tests of the packaged product in a controlled environment. For the purposes of the following examples, the packaged product pouches were stored at a temperature of 38° C.+/−2° C. and at a relative humidity of 80%+/−5%. However, to simulate recommended storage, the pouches were stored in sealed secondary containers (screw-capped high-density polyethylene jars) so the pouches were not continuously directly exposed to the high humidity conditions. Sample packages were removed after 0, 21, and 42 days and tested for film disintegration and solubility according to MonoSol Method MSTM 205. Other qualitative and quantitative characterizations were made on the films as described in MonoSol MSTM 177 (e.g., film flexibility, film/product discoloration, tensile elongation, plasticizer and moisture loss).

MonoSol Method MSTM 205, "Standard Test Method for Solubility of MONOSOL Water Soluble Film when contained within a Plastic Holder" measures the time for a water-soluble film to disintegrate and dissolve in water. Samples of unexposed and exposed film, are placed in a 35 mm slide mount and immersed in water stirred in beakers at 10° C. The times for the film to disintegrate and for film fragments to dissolve completely are measured.

EXAMPLES

Example 1

An oxidizing composition containing 85% OXONE, 14% anhydrous sodium carbonate, and 1% ZETAG 7568 cationic clarifier was prepared by blending the components. The amount of sodium carbonate was an amount sufficient to make the pH of a 1% solution of the solid composition equal to 7.2-7.6. The oxidizing composition (nominally 30 g.) was sealed in a pouch made from Film 1 having a thickness of 0.0015 inches (0.038 mm). The filled pouches were stored at 38° C. for 0, 21, and 42 days. The storage conditions were 38° C. with 80% relative humidity. However, to simulate recommended storage, the pouches were stored in sealed secondary containers (screw-capped high-density polyethylene jars) so the pouches were not continuously directly exposed to the high humidity conditions. After aging, the pouches were opened, the contents discarded and residual powder removed. Film portions were cut and mounted in frames and tested as described in Test Method 1. Disintegration time (time required for the film to start to fragment) and solubility time (time until film fragments have dissolved) were measured in triplicate and averaged. Results are shown in Table 1.

Example 2

A 300-gallon (1136 L) residential spa was used to demonstrate the treatment of a re-circulating water system with oxidizing agent in a sealed water-soluble pouch prepared as in Example 1. The spa was maintained at 99 to 100° F. (37° to 38° C.) and was sanitized with elemental bromine. Total alkalinity (expressed as mg/L calcium carbonate), total hardness (also expressed as mg/L calcium carbonate), pH and total bromine concentration were tested using AQUACHEK Select Pool and Spa test strips (from Environmental Test Systems, Inc., Elkhart Ind.) and found to be within acceptable limits (alkalinity 100-150 mg/L, total hardness 200-300 mg/L, pH 7.4 to 7.6, bromine 4 to 5 mg/L). Sealed pouches were prepared using film cast from a hydrolyzed copolymer of vinyl acetate and methyl acrylate, containing 4 to 30% by weight starch as described in the US Patent Application 2004/0161559. The film thickness was 0.002 inch (0.05 mm). The pouches were filled with the blended oxidizing composition of Example 1 (85% OXONE, 14% anhydrous sodium carbonate and 1% ZETAG 7568 polymeric clarifier). The weight of each pouch was 30 g. The length of time between fabrication of the pouches and testing in the spa water was 14 days. The pouches were stored at ambient room conditions of 70° to 72° F. (21 to 22° C.) and 50 to 60% relative humidity. The sealed pouches were individually dosed into the spa with the jets turned off so that dissolution of each pouch and its contents could be observed in the quiescent water. The pouches dissolved with vigorous effervescent action. The precise times for dissolution are given below in Table 2.

After dissolution of one pouch, a sample of the water was analyzed titrimetrically for active oxygen, using Method #4500CI-S (ferrous ammonium sulfate) in "Standard Methods for the Examination of Water and Wastewater", 19$^{th}$ Edition, American Public Health Association, Washington, D.C., 1995. The resulting concentration of OXONE was 21 mg/L (93% of theoretical). The pH, alkalinity, calcium hardness and bromine levels were unchanged after the treatment. The water was clear and free of any residue.

Comparative Example A

Comparative Example A was prepared and tested as in Example 1, except that the pouch was made from Film 2 and had a thickness of 0.0015 inches (0.038 mm). Observations of solubility times were limited to a maximum of 300 s. Results are shown in Table 1.

Comparative Example B

Comparative Example B was prepared and tested as in Example 1, except that the anhydrous sodium carbonate was omitted. Observations of disintegration and solubility times were limited to a maximum of 300 s. Results are shown in Table 1.

Comparative Example C

Comparative Example C was prepared and tested as in Comparative Example A, except that the anhydrous sodium carbonate was omitted.

Observations of disintegration and solubility times were limited to a maximum of 300 s. Results are shown in Table 1.

All the times shown in Table 1 are averages of three measurements except as noted. Film thickness for Example 1 and all Comparative Examples was 0.0015 inches (0.038 mm).

TABLE 1

| Aging Time, Temperature | Example 1 | Comparative Examples | | |
|---|---|---|---|---|
| | | A | B | C |
| Film # → | 1 | 2 | 1 | 2 |
| Na$_2$CO$_3$ present | Yes | Yes | No | No |
| Average Disintegration Time (s) | | | | |
| As packaged | 9 | 17 | 9 | 16 |
| 21 days, 38° C. | 12 | 23 | >300 | 22 |
| 42 days, 38° C. | 12 | 28 | >300 | 229* |
| Average Solubility Time(s) | | | | |
| As packaged | 20 | 32 | 19 | 33 |
| 21 days, 38° C. | 41 | 228 | >300 | >300 |
| 42 days, 38° C. | 29 | >300 | >300 | >300 |

*For Comparative example C, the shortest disintegration time is shown, the other two determinations were greater than 300 s.

The data in Table 1 show that only the combination of Example 1, a pH-neutral blend of OXONE and sodium carbonate packaged in a film containing a hydrolyzed copolymer of poly(vinyl acetate) and methyl acrylate, resulted in acceptable rapid film disintegration and solubility times (less than 150 s) when aged for 21 and 42 days at 38° C.

TABLE 2

| | Time to Dissolution Stage (s) | | |
|---|---|---|---|
| Pouch # | T$_1$ | T$_2$ | T$_3$ |
| 1 | 3 | 9 | 54 |
| 2 | 3 | 17 | 58 |
| 3 | 2 | 6 | 45 |
| 4 | 4 | 14 | 55 |
| 5 | 3 | 9 | 51 |

Dissolution stages:
T$_1$: the time the pouch initially bursts open.
T$_2$: the time that the copolymer film disintegrates and the solid contents are completely exposed.
T$_3$: time for complete dissolution of film and solid contents.

The results in Table 2 show that the sealed water-soluble pouches of the present invention were effective in the oxidative treatment of re-circulating water systems, such as a residential spa.

What is claimed is:

1. An oxidizing agent comprising a pre-measured amount of stabilized potassium hydrogen peroxymonosulfate and a buffer in a sealed water-soluble pouch, said pouch comprising a hydrolyzed copolymer of vinyl acetate and at least one of acrylic acid, methacrylic acid, maleic acid, itaconic acid, and esters thereof, and wherein the pouch dissolves completely in less than 60 seconds in water at a temperature of about 10° C. after 42 days storage at 38° C.

2. The agent of claim 1 wherein the degree of hydrolysis of the copolymer is at least 98%.

3. The agent of claim 1 wherein the copolymer is a hydrolyzed copolymer of vinyl acetate and an acrylate ester or methacrylate ester.

4. The agent of claim 3 wherein the ester is methyl acrylate.

5. The agent of claim 3 wherein the copolymer comprises a mole ratio of about 10 to about 50 of vinyl acetate to at least one of acrylic acid, methacrylic acid, maleic acid, itaconic acid, or esters thereof.

6. The agent of claim 1 wherein the copolymer further comprises ethylene, propylene or vinyl caprolactam.

7. The agent of claim 1 wherein the pouch further comprises a plasticizer.

8. The agent of claim 7 wherein the pouch further comprises at least one selected from the group consisting of an additional plasticizer, lubricant, release agent, starch, filler, extender, antiblocking agent, detackifying agent, or antifoam.

9. The agent of claim 1 wherein the pouch has a film thickness of from about 0.001 inch (0.025 mm) to about 0.007 inch (0.18 mm).

10. The agent of claim 9 wherein the pouch has a film thickness of from about 0.001 inch (0.025 mm) to about 0.003 inch (0.076 mm).

11. The agent of claim 1 wherein the stabilized potassium hydrogen peroxymonosulfate is a free flowing granular solid.

12. The agent of claim 1 wherein the stabilized potassium hydrogen peroxymonosulfate has a particle size of from about 45 to about 1200 micrometers.

13. The agent of claim 1 wherein said agent and pouch together have a specific gravity exceeding 1.0.

14. The agent of claim 1 wherein the agent further comprises a pre-measured amount of at least one selected from the group consisting of a pH buffer, clarifier, algae control agent, halide salt, oxidizer, stabilized active halogen agent, halogen stabilizer, biocidal polymer, water modifier, corrosion inhibitor, fluorosurfactant, enzyme, lanthanum salt, activator, surfactant, fragrance, dye and colorant.

15. A method of treating water comprising adding to the water a sealed water-soluble pouch containing a pre-measured amount of an oxidizing agent comprising stabilized potassium hydrogen peroxymonosulfate and a buffer, said pouch comprising a hydrolyzed copolymer of vinyl acetate and at least one of acrylic acid, methacrylic acid, maleic acid, itaconic acid, and esters thereof, and wherein the pouch dissolves completely in less than 60 seconds in water at a temperature of about 10° C. after 42 days storage at 38° C.

16. The method of claim 15 wherein the degree of hydrolysis of the copolymer is at least 98%.

17. The method of claim 15 wherein the copolymer is a hydrolyzed copolymer of vinyl acetate and an acrylate ester or methacrylate ester.

18. The method of claim 15 wherein the copolymer further comprises ethylene, propylene, or vinyl caprolactam.

19. The method of claim 15 wherein the pouch further comprises a plasticizer.

20. The method of claim 15 wherein the pouch further comprises at least one selected from the group consisting of an additional plasticizer, lubricant, release agent, starch, filler, extender, antiblocking agent, detackifying agent, or antifoam.

21. The method of claim 15 wherein the pouch has a film thickness of from about 0.001 inch (0.025 mm) to about 0.007 inch (0.18 mm).

22. The method of claim 15 wherein the pouch has a film thickness of from about 0.001 inch (0.025 mm) to about 0.003 inch (0.076 mm).

23. The method of claim 15 wherein said agent and pouch together have a specific gravity exceeding 1.0.

24. The method of claim 15 wherein the oxidizing agent further comprises a pre-measured amount of an agent selected from the group consisting of a pH buffer, clarifier, algae control agent, halide salt, oxidizer, stabilized active halogen agent, halogen stabilizer, biocidal polymer, water modifier, corrosion inhibitor, fluorosurfactant, enzyme, lanthanum salt, activator, surfactant, fragrance, dye and colorant.

* * * * *